United States Patent
Spitler et al.

(10) Patent No.: US 8,523,260 B2
(45) Date of Patent: Sep. 3, 2013

(54) CONSOLE STORAGE RETENTION STRUCTURE

(75) Inventors: Nicholas Spitler, Hudson, MI (US); Nobutaka Takeuchi, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/538,066

(22) Filed: Jun. 29, 2012

(65) Prior Publication Data

US 2012/0261936 A1 Oct. 18, 2012

Related U.S. Application Data

(63) Continuation of application No. 12/718,334, filed on Mar. 5, 2010, now Pat. No. 8,210,592.

(51) Int. Cl.
*B60R 7/04* (2006.01)

(52) U.S. Cl.
USPC ...................................... 296/37.8; 296/24.34

(58) Field of Classification Search
USPC .................. 296/37.8, 24.34, 37.15; 224/275, 224/539, 926; 220/212, 811, 812
See application file for complete search history.

(56) References Cited

U.S. PATENT DOCUMENTS

| 2,934,391 | A | 4/1960 | Bohnett |
| 4,986,589 | A | 1/1991 | McNew |
| 8,210,592 | B2 * | 7/2012 | Spitler et al. ................. 296/37.8 |
| 2005/0035618 | A1 | 2/2005 | Toth et al. |
| 2007/0182184 | A1 | 8/2007 | Lota |
| 2008/0315606 | A1 | 12/2008 | Sturt et al. |

* cited by examiner

*Primary Examiner* — Stephen Gordon

(74) *Attorney, Agent, or Firm* — Young, Basile, Hanlon & MacFarlane, P.C.

(57) ABSTRACT

Disclosed herein are embodiments of a console for use in a vehicle. One embodiment comprises a compartment defined by a first wall and a second wall that are spaced apart from one another in a first direction, a first channel disposed adjacent to the first wall, the first channel defining an opening oriented in an upward direction and including first and second end surfaces spaced apart along the first channel, a retainer structure disposed within the first channel and spaced from the first and second end surfaces and a tray member having an engagement structure configured to be received within the first channel. The tray member is positionable within the compartment such that the engagement structure is received within the first channel and engages the retainer structure to restrain movement of the tray member along the first channel toward both of the first end surface and the second end surface.

20 Claims, 6 Drawing Sheets

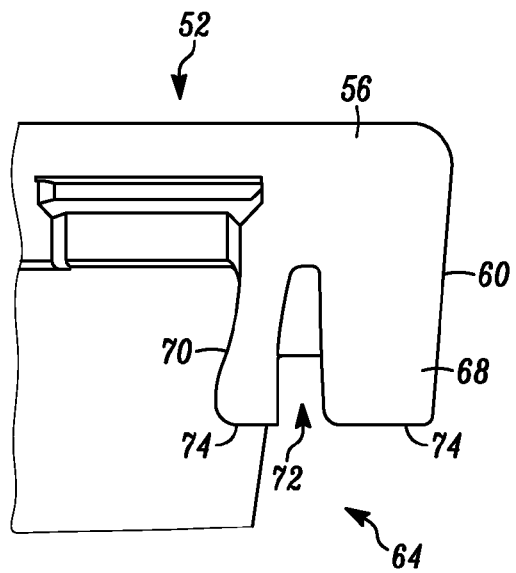
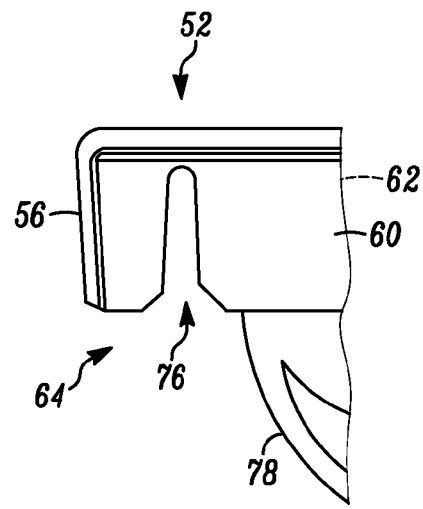
FIG. 5  FIG. 6
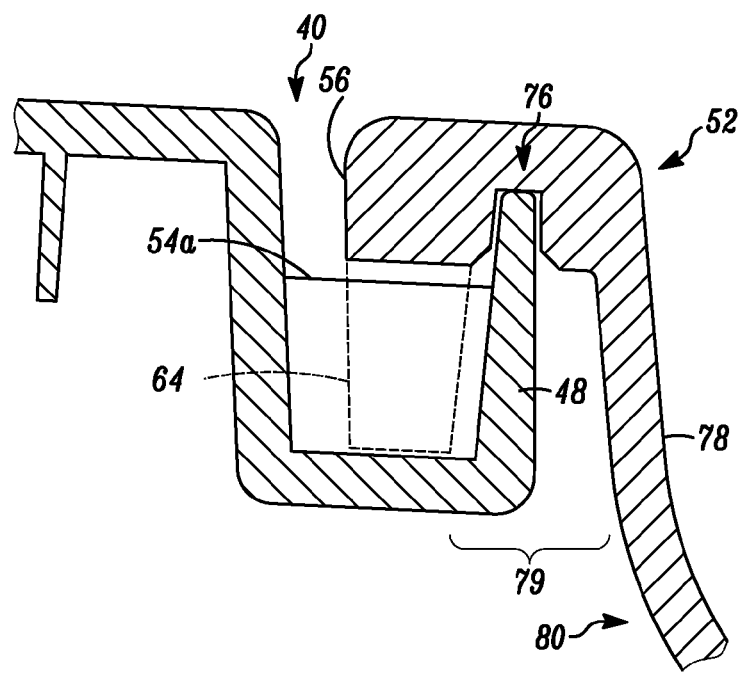
FIG. 7

CONSOLE STORAGE RETENTION STRUCTURE

CROSS REFERENCE TO RELATED APPLICATION

This application is a continuation of U.S. patent application Ser. No. 12/718,334, filed Mar. 5, 2010, now U.S. Pat. No. 8,210,592, which is incorporated herein by reference in its entirety.

TECHNICAL FIELD

The present invention relates to the field of vehicle storage consoles, and more particularly, to a vehicle console having a storage retention structure.

BACKGROUND

It is well known to provide consoles in motor vehicles that have storage compartments integrated therein. Such storage consoles are often located in between a front driver's seat and a front passenger's seat of the vehicle, but such consoles may be positioned in various other locations throughout the vehicle. Central to vehicle console design is the requirement that meaningful storage options be provided to the users of the vehicle. In pursuit of this goal, vehicle designers have proposed a vast array of designs for console storage compartments, including console storage compartments that may be reconfigured by the user to suit their specific needs.

Providing a console having a storage compartment that is reconfigurable presents some unique challenges. The reconfigurable elements must be easily repositionable by the user, but, at the same time, must be secured firmly in place. Firm securement of the moveable components ensures that they do not become inadvertently dislodged. Additionally, the presence of squeak and rattle noise within the vehicle should be minimized. Balancing these competing design goals while at the same time providing meaningful storage options for the user has proven difficult, and past designs have met varying degrees of success. Need remains for improvement in the field of console storage retention structures.

BRIEF SUMMARY

A console for use in a vehicle having a retention structure according to the invention is taught herein. Disclosed herein are embodiments of a console for use in a vehicle. One embodiment comprises a compartment defined by a first wall and a second wall that are spaced apart from one another in a first direction, a first channel disposed adjacent to the first wall, the first channel defining an opening oriented in an upward direction and including first and second end surfaces spaced apart along the first channel, a retainer structure disposed within the first channel and spaced from the first and second end surfaces and a tray member having an engagement structure configured to be received within the first channel. The tray member is positionable within the compartment such that the engagement structure is received within the first channel and engages the retainer structure to restrain movement of the tray member along the first channel toward both of the first end surface and the second end surface.

Another embodiment of a console for use in a vehicle comprises a compartment defined by a first wall and a second wall that are spaced apart from one another in a first direction, a first channel disposed adjacent to the first wall, the first channel defining an opening oriented in an upward direction and including first and second end surfaces spaced apart along the first channel, a second channel disposed adjacent to the second wall, the second channel defining an opening oriented in an upward direction and including first and second end surfaces spaced apart along the second channel, a plurality of retainer structures disposed within the first channel and spaced from the first and second end surfaces and a tray member having a plurality of engagement structures configured to be received within the first channel, with at least a portion of the tray member configured to be received within the second channel, the tray member is positionable within the compartment such that each of the plurality of engagement structures is received within the first channel and engages at least one of the plurality of retainer structures to restrain movement of the tray member along the first channel toward both of the first end surface and the second end surface.

BRIEF DESCRIPTION OF THE DRAWINGS

The description herein makes reference to the accompanying drawings wherein like reference numerals refer to like parts throughout the several views, and wherein:

FIG. 5 is a front profile detail showing an engagement structure of the tray member;

FIG. 6 is a side profile detail showing an engagement structure of the tray member;

FIG. 7 is a front, cross-sectional view showing engagement of the tray member with a channel that is defined within the compartment of the console;

DETAILED DESCRIPTION

Figure 1:
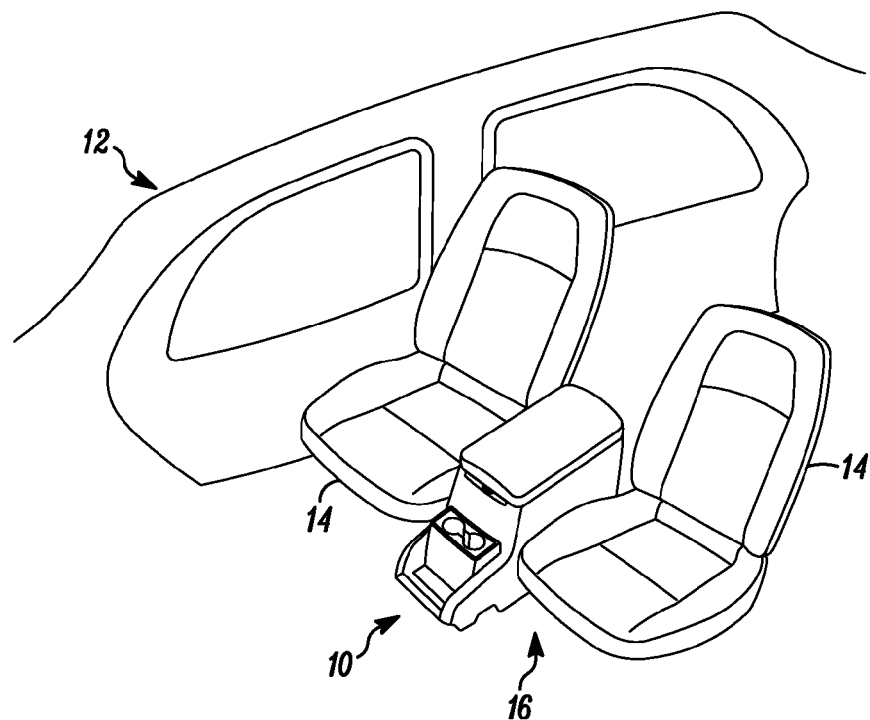
FIG. 1 is a perspective view showing the interior of a vehicle having a console according to the present invention installed therein.

FIG. 1 shows a console 10 according to the invention installed within a vehicle 12. The vehicle 12 includes first and second spaced-apart seats 14 that are disposed within a passenger compartment 16 of the vehicle 12. The console 10 is located in between the seats 14 within the passenger compartment 16 of the vehicle 12.

Figure 2:
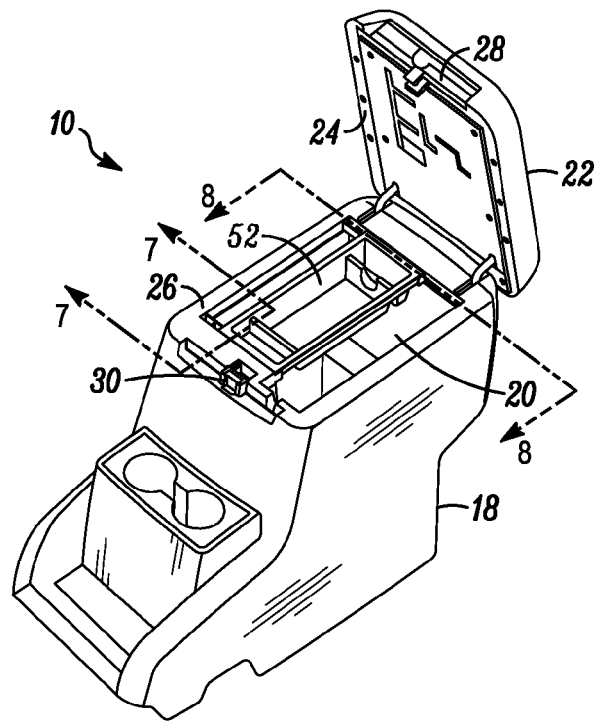
FIG. 2 is a perspective view showing the console in an open position, wherein a tray member is disposed within a compartment that is defined within the console.

As shown in FIG. 2, the console 10 includes a body portion 18 having a compartment 20 defined therein and a lid 22 that is pivotally-mounted to the body portion 18 of the console 10. In particular, the lid 22 is moveable with respect to the body portion 18 of the console 10 between a closed position, wherein an underside 24 of the lid 22 is engaged with a surface 26 that extends around the periphery of the compartment 20, and an open position, wherein the lid 22 is pivoted away from the compartment 20 of the console 10, to allow access to the interior of the compartment 20. A latch 28 may be provided on the lid 22 for engagement with a striker 30 that is provided on the body portion 18 for securing the lid 22 with respect to the body portion 18 of the console 10 when the lid 22 is in the closed position.

Figure 3:
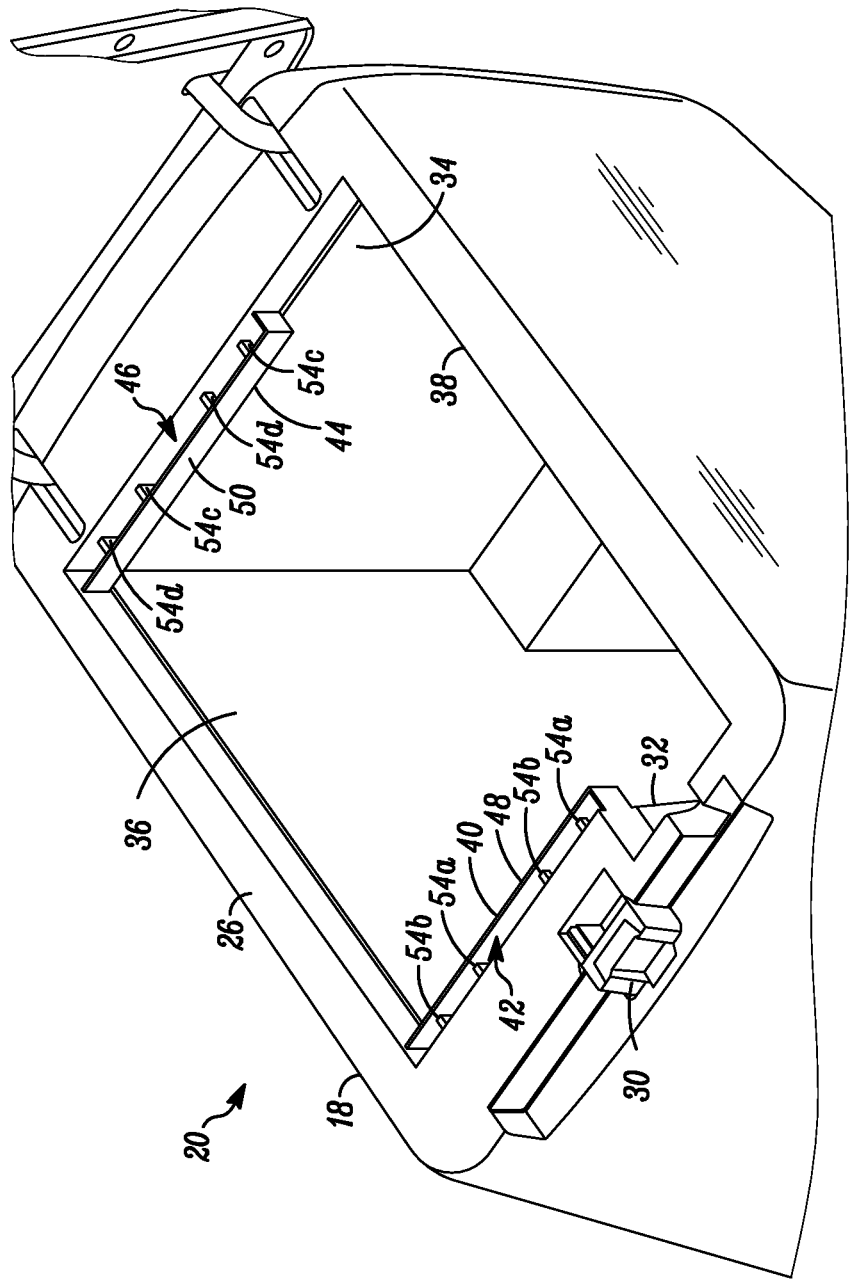
FIG. 3 is a perspective view showing the compartment that is defined within the console.

As best seen in FIG. 3, the compartment 20 is defined by a first wall 32, a second wall 34, a third wall 36, and a fourth wall 38, all of which are portions of the body portion 18 of the console 10. The first wall 32 and the second wall 34 are spaced apart from one another in a first or longitudinal (e.g., fore-to-aft in a vehicle) direction. The third wall 38 and the fourth wall 40 are spaced apart from one another in a second or lateral (e.g., cross-car in a vehicle) direction that is substantially perpendicular to the longitudinal direction.

A first channel 40 is disposed adjacent to the first wall 32 and includes an opening 40 that is oriented in an upward direction. A second channel 44 is disposed adjacent to the second wall 34 and includes an opening 46 that is oriented in an upward direction. The first channel 40 and the second channel 44 may be elongate structures that extend along the first wall 32 and the second wall 34, respectively (e.g., along at least a majority of the first wall 32 and the second wall 34, respectively, as shown in FIG. 3). In particular, the first channel 40 is defined in part by an elongate wall 48 that is positioned opposite the first wall 32 of the compartment 20. Similarly, the second channel 44 is defined in part by an elongate wall 50 that is opposite the second wall 34 of the compartment 20. Furthermore, the first channel 40 and the second channel 44 may each define a substantially U-shaped cross-section having either rectilinear, curvilinear, or substantially arcuate sides including the elongate walls 48, 50, respectively. Additionally, the first channel 40 and the second channel 44 may be formed unitarily with the first wall 32 and the second wall 34, respectively. For example, the first channel 40, the second channel 44, the first wall 32, and/or the second wall 34 may be formed as a single component during a molding process.

The first channel 40 and the second channel 44 are configured and spaced with respect to one another such that they may cooperate to support hanging file folders of a conventional type. While the entire width of the first channel 40 and the second channel 44 could be used for this purpose, alternatively, a portion of the width of the first channel 40 and the second channel 44 could be utilized to support the hanging file folders while the remainder of the width of the first channel 40 and the second channel 44 could be utilized to support a removable tray member 52 having a width that is less than the width of the first channel 40 and the second channel 44.

The tray member 52 is supported within the compartment 20 of the console 10 by the first channel 40 and the second channel 44. As will be explained in detail herein, a plurality of retainer structures 54 are provided within the first channel 40 and the second channel 44 to secure the tray member 52 with respect to the body portion 18 of the console 20. In particular, the plurality of retainer structures 54 includes a first pair of retainer structures 54*a* and a second pair of retainer structures 54*b*, both of which are disposed within the first channel 40. Similarly, the plurality of retainer structures 54 includes a third pair of retainer structures 54*c* and a fourth pair of retainer structures 54*d*, both of which are disposed within the second channel 44.

The individual retainer structures 54 that make up each pair of retainer structures 54*a* through 54*d* are laterally-spaced apart from one another. In particular, the individual retainer structures 54 that make up each pair of retainer structures 54*a* through 54*d* are spaced apart by a width that is slightly less than the width of the tray member 52. Furthermore, the first pair of retainer structures 54*a* and the second pair of retainer structures 54*b* are positioned in an overlapping configuration, such that a single retainer structure of the first pair of retainer structures 54*a* is positioned between the second pair of retainer structures 54*b* and a single one of the second pair of retainer structures 54*b* is positioned between the first pair of retainer structures 54*a*. The third pair of retainer structures 54*c* and the fourth pair of retainer structures 54*d* are positioned in a similar, staggered manner within the fourth channel 44, such that the first pair of retainer structures 54*a* and the third pair of retainer structures 54*c* are aligned with respect to each other in the first or longitudinal direction, while the second pair of retainer structures 54*b* and the fourth pair of retainer structures 54*d* are aligned with respect to each other in the first or longitudinal direction.

Figure 4:
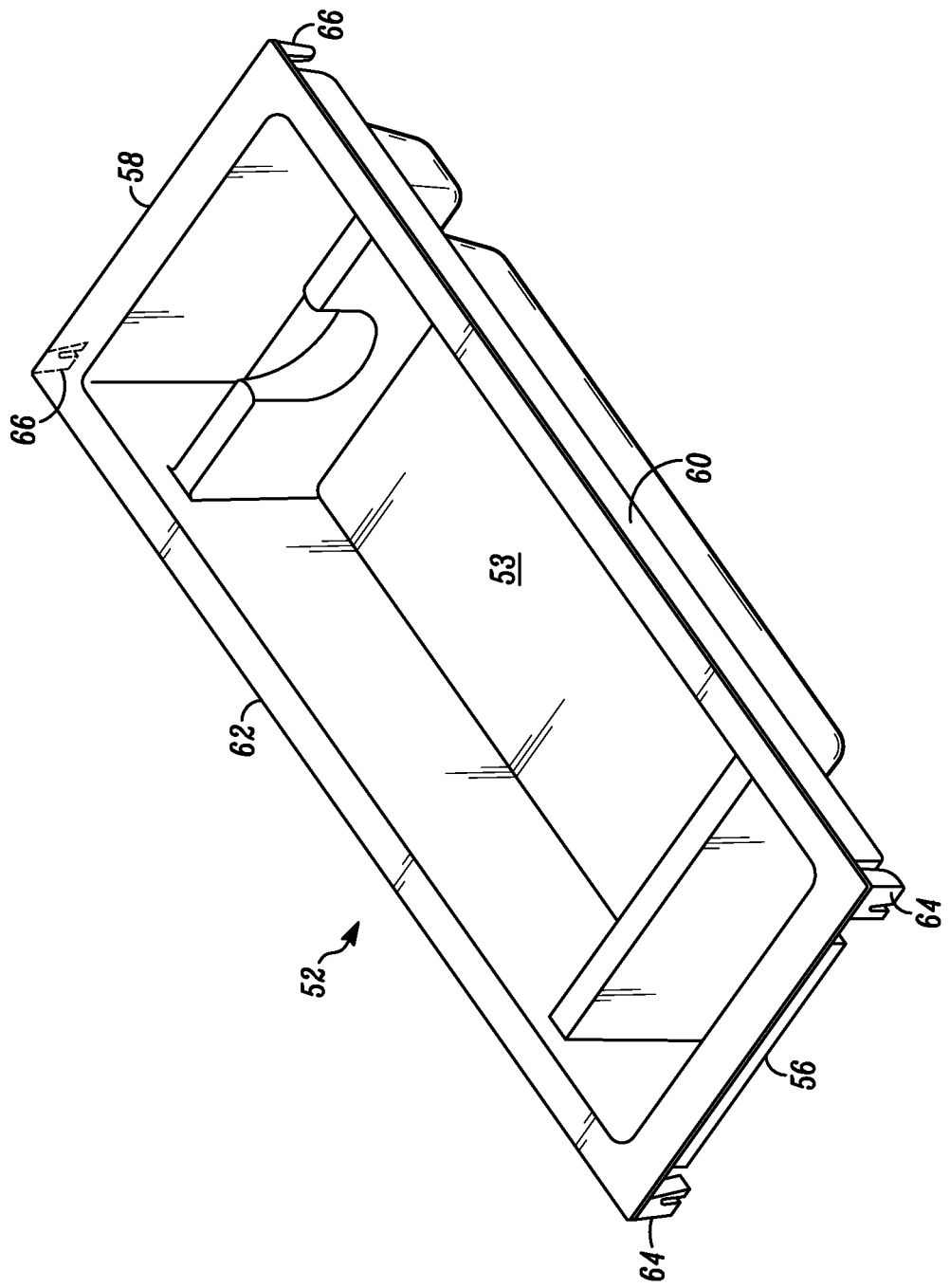
FIG. 4 is a perspective view showing the tray member.

As shown in FIG. 4, the tray member 52 is a unitary body that extends from a first end 56 to a second end 58 in the first or longitudinal direction and extends between a first side 60 and a second side 62 in the second or lateral direction. The tray member 52 defines one or more upwardly-facing storage areas 53 for holding various articles, as desired by a user.

In order to support the tray member 52 with respect to the first channel 40 and the second channel 44 of the console 10, a first pair of engagement structures 64 is positioned at the first end 56 of the tray member 52, and a second pair of engagement structures 66 is positioned at the second end 58 of the tray member 52. The first pair of engagement structures 64 is spaced apart in the second or lateral direction such that each is adjacent to a respective one of the first side 60 and the second side 62 of the tray member 52. The second pair of engagement structures 66 are likewise spaced-apart in the lateral direction such that each is adjacent to a respective one of the first side 60 and the second side 62 of the tray member 52. As will be explained in detail herein, the first pair of engagement structures 64 is configured to be received within the first channel 40, while the second pair of engagement structures 66 is configured to be received within the second channel 44. Furthermore, the first pair of engagement structures 64 are selectively engageable with either the first pair of retainer structures 54*a* or the second pair of retainer structures 54*b*. Similarly, the second pair of engagement structures are selectively engageable with the third pair of retainer structures 54*c* or the fourth pair of retainer structures 54*d*.

FIG. 5 shows one of the engagement structures of the first pair of engagement structures 64 as representative of both the first pair of engagement structures and the second pair of engagement structures 66. The engagement structure 64 is located at the first end 56 of the tray member 52 adjacent to the first side 60 of the tray member 52. More particularly, the engagement structure 64 includes an outer portion 68 that is disposed directly adjacent to the first side 60 of the tray member, and an inner portion 70 that is disposed inward of the outer portion 68 and spaced therefrom by a slot 72. Provision of the slot 72 between the outer portion 68 and the inner portion 70 of the engagement structure 64 allows the inner portion 70 of the engagement structure 64 to deflect outward toward the outer portion 68, as will be explained further herein. On both of the outer portion 68 and the inner portion 70, bottom surfaces 74 are provided for engagement with the bottom of the first channel 40 when the engagement structure 64 is disposed within the first channel 40.

As shown in FIG. 6, slots 76 are defined through the first side 60 and second side 62 of the tray member 52. The slots 76 are downwardly facing and are disposed between both the first pair of engagement structures 64, as well as the second pair of engagement structures 66 (not shown in FIG. 6), and a wall 78 that at least partially defines the storage areas 53 of the tray member 52. The slots 76 extend across the tray member 52 in the second, lateral direction. The elongate walls 48, 50 of the first channel 40 and the second channel 44, respectively, are receivable within the slots 76 to further support and retain the tray member 52 with respect to the compartment 20 of the console 10. As shown in FIG. 7, the slots 76 that are defined through the first side 60 and the second side 62 of the tray member 52 may be aligned with or integrally-formed with a downwardly-facing groove 79 that is provided on an underside 80 of the tray member 52 at each of the first end 56 and the second end 58 thereof. As with the slots 76, the elongate walls 48, 50 of the first channel 40 and the second channel 44, respectively, are receivable within the downwardly facing groove 79. It should be apparent that engagement of any of the engagement structures 64, 66, the slots 76 and/or the grooves 79 with respective portions of the first channel 40 and the second channel 44 is operable to restrain movement of the tray member 52 with respect to the console 10 in the first or longitudinal direction.

Figure 8:
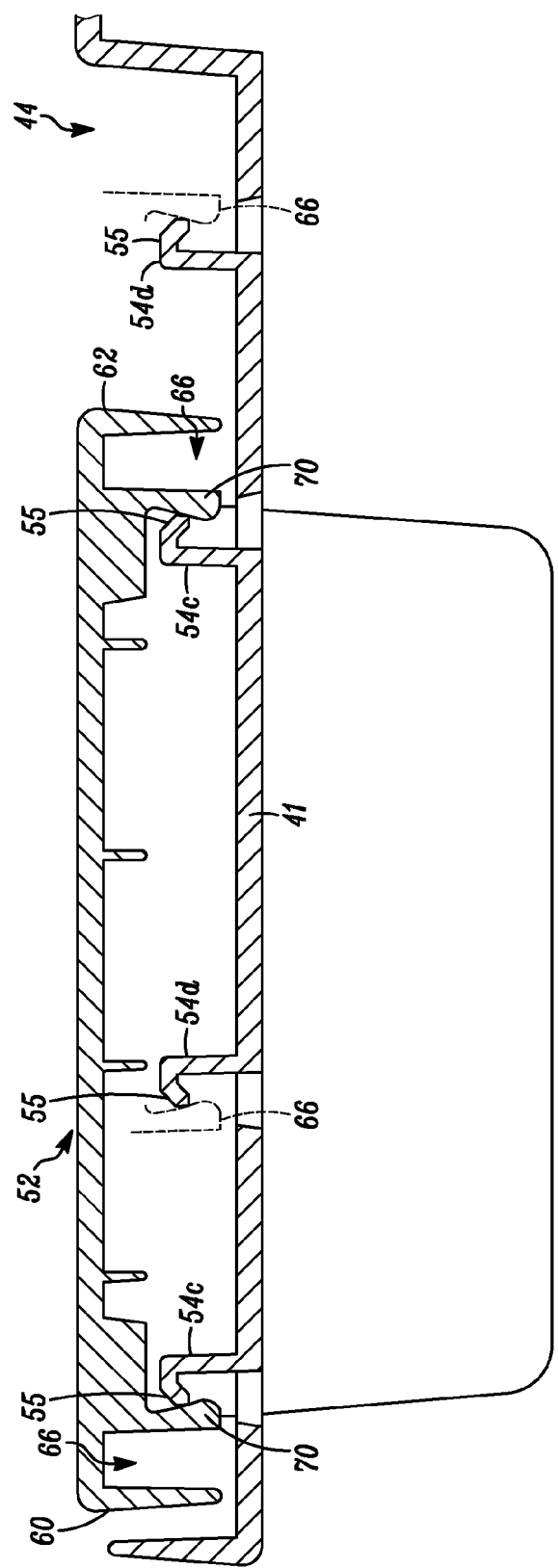
FIG. 8 is a side, cross-sectional view showing engagement of the tray member with the second channel of the compartment in the console.

Engagement of the tray member 52 with the first channel 40 and the second channel 44 will be further understood with reference to FIG. 8, which shows the second pair of engagement structures 66 of the tray member 52 disposed within the second channel 44 and in engagement with the third pair of retainer structures 54c. The retainer structures 54c, 54d extend upward from a bottom wall 41 of the second channel 44 for engagement with the second pair of engagement structures 66 of the tray member 52. Through engagement of the engagement structures 64, 66 with the retainer structures 54a-54d, movement of the tray member 52 with respect to the console 10 is restrained in the second or lateral direction.

In the illustrated embodiment, the third and fourth pairs of retainer structures 54c, 54d are substantially J-shaped members having hooked portions 55 opposite the bottom wall 41 of the second channel 44. Since the third and fourth pairs of retainer structures 54c, 54d are formed integrally with the second channel 44 from a plastic material, the third and fourth pairs of retainer structures 54c, 54d exhibit some resiliency at their hook-shaped portions 55. This, coupled with the fact that the inner portions 70 of the second pair of engagement structures 66 also exhibit some resiliency, serves to define a snap-fit engagement between the second pair of retainer structures 66 and any of the third pair of retainer structures 54c and the fourth pair of retainer structures 54d (shown in phantom in FIG. 8). Alternatively, it will be readily understood that a friction fit could be defined between the engagement structures 64, 66 and the retainer structures 54a-54d, for example, by providing either of the engagement structures 64, 66 or the retainer structures 54a-54d in the form of openings, while providing the other of the engagement structures 64, 66 and the retainer structures 54a-54d in the form of projections that are dimensioned to be received within the openings by a friction fit.

Figure 9:
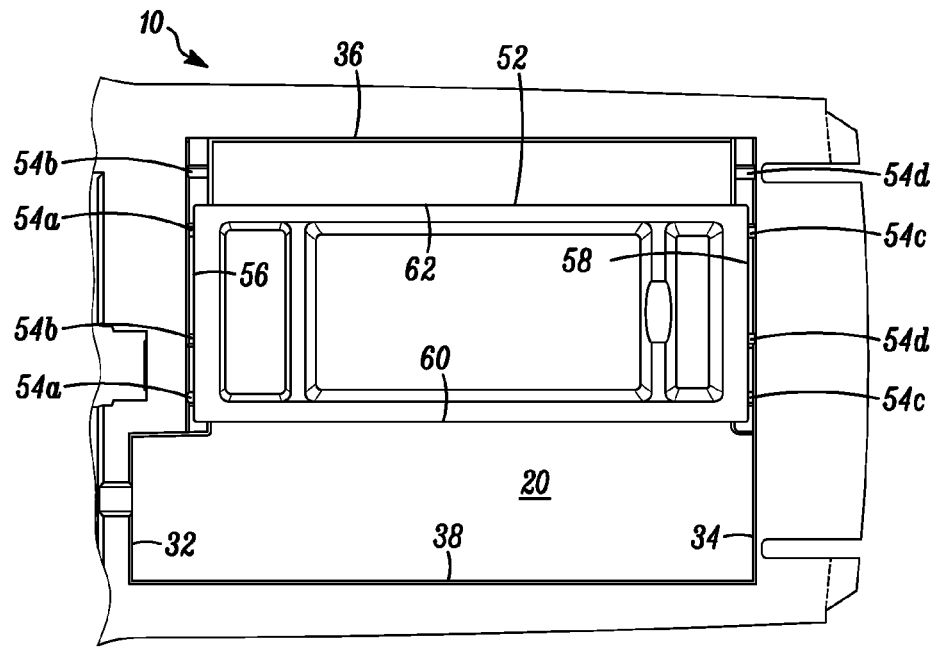
FIG. 9 is a plan view showing a tray member disposed in a first position within the compartment of the console.
Figure 10:
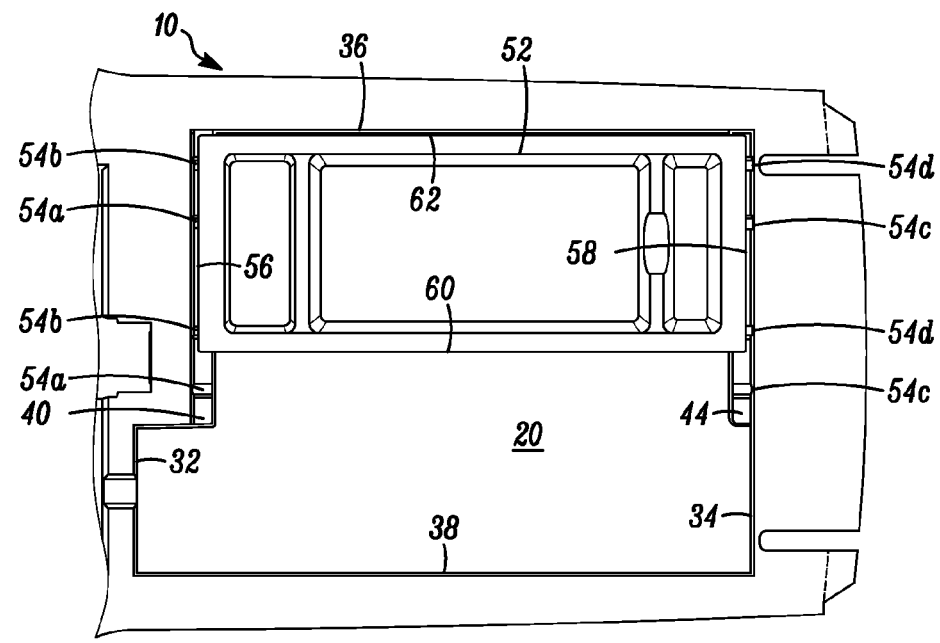
FIG. 10 is a plan view showing the tray member disposed in a second position within the compartment of the console.

As can be appreciated from the foregoing, the tray member 52 is positionable within the compartment 20 of the console 10 in a first position, as shown in FIG. 9, and a second position, as shown in FIG. 10. In the first position, the first pair of engagement structures 64 of the tray member 52 are disposed within the first channel 40 and are engaged with the first pair of retainer structures 54a. Similarly, the second pair of engagement structures 66 of the tray member 52 are disposed within the second channel 54 and are engaged with the third pair of retainer structures 54c when the tray member 52 is in the first position. In this manner, a space is defined between the second side 62 of the tray member 52 and the third wall 36 along the first channel 40 and the second channel 44. This defines a first storage area in which hanging files may be stored between the third wall 36 and the tray member 52 when the tray member 52 is disposed within the compartment 20 and in the first position.

In the second position, the first pair of engagement structures 64 of the tray member 52 is disposed within the first channel 40 and is engaged with the second pair of retainer structures 54b. Similarly, the second pair of engagement structures 66 of the tray member 52 are disposed within the second channel 44 and are engaged with the fourth pair of retainer structures 54d such that a second space is defined between the first side 60 of the tray member 52 and the fourth wall 38 along the first channel 40 and the second channel 44. This provides a second storage area for hanging files within the compartment 20 when the tray member 52 is disposed in the second position within the compartment 20 of the console 10.

Herein, the engagement structures 64, 66, the slots 76 and/or the grooves 79 are described as cooperating with respective portions of the first channel 40 and the second channel 44 to restrain movement of the tray member 52 with respect to the console 10 in the first or longitudinal direction, while the engagement structures 64, 66 are described as cooperating with the retainer structures 54a-54d to restrain movement of the tray member 52 with respect to the console 10 in the second or lateral direction. However, it should be understood that any of these elements could be reoriented to provide restraint in any desired direction. For example, the engagement structures 64, 66 and the retainer structures 54a-54d could be rotated 90 degrees such that they cooperate to restrain movement of the tray member 52 with respect to the console 10 in the first or longitudinal direction.

In use, a user may install the tray member 52 within the compartment 20 of the console 10 of the vehicle 12 in the first position or the second position. Alternatively, the user could remove the tray member 52 from the compartment 20 of the console 10 and then utilize the compartment 20 without the tray member 52.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A console for use in a vehicle, the console comprising:
 a compartment defined by a first wall and a second wall that are spaced apart from one another in a first direction;
 a first channel disposed adjacent to the first wall, the first channel defining an opening oriented in an upward direction and including first and second end surfaces spaced apart along the first channel;
 a retainer structure disposed within the first channel and spaced from the first and second end surfaces; and
 a tray member having an engagement structure configured to be received within the first channel, wherein the tray member is positionable within the compartment such that the engagement structure is received within the first channel and engages the retainer structure to restrain movement of the tray member along the first channel toward both of the first end surface and the second end surface.

2. The console of claim 1, further comprising:
the retainer structure included in a first pair of laterally spaced apart retainer structures disposed within the first channel and spaced from the first and second end surfaces; and
the engagement structure included in a first pair of spaced apart engagement structures that are configured to be received within the first channel, wherein the tray member is positionable within the compartment in a first position where the first pair of engagement structures is received within the first channel and engages the first pair of retainer structures to restrain movement of the tray member along the first channel toward both of the first end surface and the second end surface.

3. The console of claim 2, further comprising:
a second pair of laterally spaced apart retainer structures disposed within the first channel and spaced from the first and second end surfaces,
wherein the tray member is positionable within the compartment in a second position where the first pair of engagement structures is received within the first channel and engages the second pair of retainer structures to restrain movement of the tray member along the first channel toward both of the first end surface and the second end surface.

4. The console of claim 3, wherein the compartment is further defined by a third wall and a fourth wall that are spaced apart from one another in a second direction that is perpendicular to the first direction, wherein a first space is defined between the tray member and the third wall when the tray member is in the first position, and wherein a second space is defined between the tray member and the fourth wall when the tray member is in the second position.

5. The console of claim 1, further comprising:
the retainer structure included in a plurality of laterally spaced apart retainer structures disposed within the first channel and spaced from the first and second end surfaces; and
the engagement structure included in a plurality of spaced apart engagement structures configured to be received within the first channel,
wherein the tray member is positionable within the compartment such that each of the plurality of engagement structures is received within the first channel and engages at least one of the plurality of retainer structures to restrain movement of the tray member along the first channel toward both of the first end surface and the second end surface.

6. The console of claim 1, wherein the tray member is positionable within the compartment such that the tray member is spaced apart from both the first and second end surfaces when the engagement structure is received within the first channel and engages the retainer structure.

7. The console of claim 1, further comprising:
the retainer structure projecting from the first channel towards the opening, wherein an end portion of the retainer structure is positioned within the first channel and spaced from the opening.

8. The console of claim 1, further comprising:
the retainer structure including a base portion projecting from a bottom surface of the first channel towards the opening and including a hooked end portion opposite the bottom surface and angularly offset from the base portion.

9. The console of claim 8, wherein the retainer structure is a substantially J-shaped member.

10. The console of claim 1, wherein the engagement structure includes an inner portion defining a cavity and the retainer structure defines a projection that is receivable within at least a portion of the cavity.

11. The console of claim 1, wherein engagement of the engagement structure of the tray member with the retainer structure restrains movement of the tray member in a second direction that is perpendicular to the first direction.

12. A console for use in a vehicle, the console comprising:
a compartment defined by a first wall and a second wall that are spaced apart from one another in a first direction;
a first channel disposed adjacent to the first wall, the first channel defining an opening oriented in an upward direction and including first and second end surfaces spaced apart along the first channel;
a second channel disposed adjacent to the second wall, the second channel defining an opening oriented in an upward direction and including first and second end surfaces spaced apart along the second channel;
a plurality of retainer structures disposed within the first channel and spaced from the first and second end surfaces of the first channel; and
a tray member having a plurality of engagement structures configured to be received within the first channel, with at least a portion of the tray member configured to be received within the second channel, the tray member is positionable within the compartment such that each of the plurality of engagement structures is received within the first channel and engages at least one of the plurality of retainer structures to restrain movement of the tray member along the first channel toward both of the first end surface of the first channel and the second end surface of the first channel.

13. The console of claim 12, further comprising:
the plurality of retainer structures including a first pair of laterally spaced apart retainer structures disposed within the first channel and a second pair of laterally spaced apart retainer structures disposed within the first channel; and
the plurality of engagement structures including a first pair of spaced apart engagement structures configured to be received within the first channel;
wherein the tray member is positionable within the compartment in a first position where the first pair of engagement structures is received within the first channel and engages the first pair of retainer structures and is positionable within the compartment in a second position where the first pair of engagement structures is received within the first channel and engages the second pair of retainer structures.

14. The console of claim 13, wherein the compartment is further defined by a third wall and a fourth wall that are spaced apart from one another in a second direction that is perpendicular to the first direction, wherein a first space is defined between the tray member and the third wall when the tray member is in the first position, and wherein a second space is defined between the tray member and the fourth wall when the tray member is in the second position.

15. The console of claim 13, further comprising:
a third pair of laterally spaced apart retainer structures disposed within the second channel and spaced from the first and second end surfaces of the second channel and a fourth pair of laterally spaced apart retainer structures disposed within the second channel and spaced from the first and second end surfaces of the second channel; and the tray member having a second pair of spaced apart engagement structures configured to be received within the second channel, wherein the second pair of spaced apart engagement structures of the tray member are disposed within the second channel and are engaged with the third pair of retainer structures when the tray member is in the first position, and wherein the second pair of spaced apart engagement structures of the tray member are disposed within the second channel and are engaged with the fourth pair of retainer structures when the tray member is in the second position.

16. The console of claim 12, wherein the tray member is positionable within the compartment such that the tray member is spaced apart from both the first and second end surfaces of the first channel when each of the plurality of engagement structures is received within the first channel and engages at least one of the plurality of retainer structures.

17. The console of claim 12, further comprising:
each of the plurality of retainer structures projecting from the first channel towards the opening defined by the first channel, wherein an end portion of each of the plurality of retainer structures is positioned within the first channel and spaced from the opening defined by the first channel.

18. The console of claim 12, further comprising:
each of the plurality of retainer structures including a base portion projecting from a bottom surface of the first channel towards the opening defined by the first channel and including a hooked end portion opposite the bottom surface and angularly offset from the base portion.

19. The console of claim 18, wherein each of the plurality of retainer structures are substantially J-shaped members.

20. The console of claim 12, wherein each of the plurality of engagement structures includes a respective inner portion defining a cavity and each of the plurality of retainer structures defines a projection that is receivable within at least a portion of the corresponding cavity.

* * * * *